US008695998B1

(12) United States Patent
Karel et al.

(10) Patent No.: US 8,695,998 B1
(45) Date of Patent: Apr. 15, 2014

(54) AXLE LIFT ASSEMBLY

(71) Applicant: SAF-HOLLAND, Inc., Holland, MI (US)

(72) Inventors: Jonathon Karel, Zeeland, MI (US); William Hicks, Muskegon, MI (US); Gary Greer, Cambridge (CA)

(73) Assignee: SAF-HOLLAND, Inc., Holland, MI (US)

( * ) Notice: Subject to any disclaimer, the term of this patent is extended or adjusted under 35 U.S.C. 154(b) by 0 days.

(21) Appl. No.: 13/966,789

(22) Filed: Aug. 14, 2013

Related U.S. Application Data

(60) Provisional application No. 61/767,029, filed on Feb. 20, 2013.

(51) Int. Cl.
*B62D 61/12* (2006.01)

(52) U.S. Cl.
USPC .......................................................... 280/86.5

(58) Field of Classification Search
USPC ............. 280/86.5, 124.116, 124.157, 124.16, 280/6.157, 6.519, 5.514; 180/24.02, 209
See application file for complete search history.

(56) References Cited

U.S. PATENT DOCUMENTS 3,201,141 A 8/1965 Bernstein et al.
3,499,663 A 3/1970 Hedlund et al.
4,284,156 A 8/1981 Carstensen et al.
4,854,409 A 8/1989 Hillebrand et al.
5,088,763 A * 2/1992 Galazin et al. ................ 280/656
5,335,932 A * 8/1994 Pierce ........................... 280/788
5,505,482 A * 4/1996 VanDenberg ................ 280/86.5
5,882,031 A * 3/1999 VanDenberg ................. 280/683
6,416,069 B1 * 7/2002 Ramsey ................. 280/124.116
6,880,839 B2 * 4/2005 Keeler et al. ................. 280/86.5
7,434,821 B2 * 10/2008 Hinz ............................ 280/86.5
7,591,336 B2 * 9/2009 Hackmann .................... 180/209
7,748,724 B2 * 7/2010 Gottschalk ................... 280/86.5
8,025,302 B2 * 9/2011 Saieg et al. ................ 280/149.2
8,522,933 B2 * 9/2013 Chalin et al. .................. 188/266
2012/0313342 A1 * 12/2012 Ramsey ................. 280/124.157

OTHER PUBLICATIONS

Haldex Brake Products Corporation. “ILAS III® Lift Axle Control Valve for Commercial Vehicles and Trailers.” http://www.haldex.com/en/North-America/Applications-Products/Product-categories/Brake--Suspension-Systems/Product-Information/Air-Suspension-Control-Systems-new/ILAS-III-Lift-Axle-Control-Valve/.
WABCO. Printed Jul. 2, 2013. “Lift axle control valve 463 084.” http://inform.wabco-auto.com/intl/pdf/815/01/78/01/463084.pdf. 12 pages.

(Continued)

*Primary Examiner* — Faye M. Fleming
(74) *Attorney, Agent, or Firm* — Price Heneveld LLP

(57) ABSTRACT

An axle lift assembly includes a beam slidably coupled with and extending on a longitudinal extent of a vehicle frame. A trailing arm has a first end pivotably coupled with the beam. An axle is rotatably coupled with an intermediate portion of the trailing arm. An air spring is disposed between a second end of the trailing arm and the beam for absorbing an upward force from the axle. A support bracket extends down from the beam proximate the first end of the trailing arm. A pneumatic actuator is disposed between the support bracket and the trailing arm for raising the axle from a deployed position to a retracted position that substantially eliminates the upward force on the air spring from the axle.

18 Claims, 12 Drawing Sheets

22 12 1A 1A 16 22 24 30 18 20 32 30 14 28 26 10 20 36 36

(56) References Cited

OTHER PUBLICATIONS

Haldex Brake Products Corporation. "ILAS III® Lift Axle Control Valve for Commercial Vehicles and Trailers." http://www.haldex.com/en/North-America/Applications-Products/Product-categories/Brake—Suspension-Systems/Product-Information/Air-Suspension-Control-Systems-new/ILAS-III-Lift-Axle-Control-Valve/. US Rev. Dec. 2009. 4 pages.

Haldex Brake Products Corporation. "ILAS III® and COLAS®." http://www.haldex.com/en/North-America/Applications-Products/Product-categories/Brake—Suspension-Systems/Product-Information/Air-Suspension-Control-Systems-new/ILAS-III-Lift-Axle-Control-Valve/. Copyright 2008. 6 pages, Oct. 2008.

Wikipedia. "Dead axles/lazy axles." http://en.wikipedia.org/wiki/Axle#Dead_axles.2Flazy_axles. 1 page, printed Jul. 4, 2013.

* cited by examiner

AXLE LIFT ASSEMBLY

CROSS-REFERENCE TO RELATED APPLICATIONS

This application claims priority under 35 U.S.C. §119(e) to, and the benefit of, U.S. Provisional Patent Application No. 61/767,029, entitled "AXLE LIFT ASSEMBLY," filed on Feb. 20, 2013, the entire disclosure of which is hereby incorporated by reference.

FIELD OF THE INVENTION

The present invention generally relates to an axle lift assembly, and more particularly, to an axle lift assembly for a vehicle that, in one embodiment, is longitudinally slidable relative to a chassis of the vehicle and actuatable based on weight of a load carried by the vehicle.

BACKGROUND OF THE INVENTION

As businesses attempt to optimize inventory levels to meet variable demand, it is common for modern industrial vehicles, including trucks and trailers, to be used for shipping a wide variety of load types and configurations. In general, it is advantageous to alter a vehicle's carrying capacity by adding or removing trailers from the vehicle or using alternatively sized trailers to accommodate the mass and volume of the load. For example, for loads with a smaller volume requirement, but a larger mass requirement, it can be beneficial to utilize a vehicle with additional axles for dispersing the weight of the load over more tires. However, it can be inefficient to pull such a trailer when the additional tires are unnecessary to disperse a light load, given that added tires increase friction and weight, as well as increase the cost of roadway tolls. It can also be expensive to own and maintain several vehicles and trailers for various load types and configurations. Nevertheless, to be competitive and profitable it is becoming increasingly more important to reduce a vehicle's fuel consumption, unnecessary wear on tires, and improve other vehicle inefficiencies.

BRIEF SUMMARY OF THE INVENTION

According to one aspect of the present invention, an axle lift assembly includes a beam slidably coupled with a longitudinal extent of a vehicle frame. A trailing arm has a first end pivotably coupled with the beam. An axle is rotatably coupled with an intermediate portion of the trailing arm. An air spring is disposed between a second end of the trailing arm and the beam for receiving an upward force from a wheel on the axle contacting a ground surface. A support bracket extends down from the beam proximate the first end of the trailing arm. A pneumatic actuator is disposed between the support bracket and the trailing arm for raising the axle from a ground engagement position to a lifted position that substantially eliminates the upward force on the air spring.

According to another aspect of the present invention, an axle lift assembly for a trailer includes a longitudinal beam adapted for slidably coupling with a frame member of the trailer. A trailing arm has a first end pivotably coupled with the longitudinal beam. An axle is rotatably coupled with an intermediate portion of the trailing arm. An air spring is disposed between a second end of the trailing arm and the longitudinal beam for receiving an upward force on the axle. A support bracket extends down from the longitudinal beam proximate the first end of the trailing arm. A pneumatic actuator is disposed between the support bracket and the trailing arm. The pneumatic actuator is adjustable from a deflated position to an inflated position that raises the axle toward the longitudinal beam a distance adapted to raise an associated tire on the axle away from a ground surface.

According to yet another aspect of the present invention, a trailer includes a frame member. A first axle assembly is coupled with the frame member and includes a trailing arm having a first end pivotably coupled with the frame member. A first air spring is coupled between a second end of the trailing arm and the frame member. A first axle is rotatably coupled with the trailing arm. A first wheel is coupled with a distal end of the first axle and has a first tire for contacting a ground surface. A lift assembly is coupled between the trailing arm and the frame member. The lift assembly is actuatable between a retracted position allowing the first tire to contact the ground surface and a deployed position elevating the first tire away from the ground surface. A second axle assembly is coupled with the frame member and includes a second axle parallel with the first axle. A second air spring is coupled between the second axle and the frame member. A sensor monitors an air pressure of the second air spring. The lift assembly moves between the retracted and deployed positions based on the air pressure of the second air spring. A slide assembly for longitudinally adjusting the position of at least the first axle assembly relative to the frame member.

These and other features, advantages, and objects of the present invention will be further understood and appreciated by those skilled in the art by reference to the following specification, claims, and appended drawings.

DETAILED DESCRIPTION OF THE EMBODIMENTS

Figure 1:
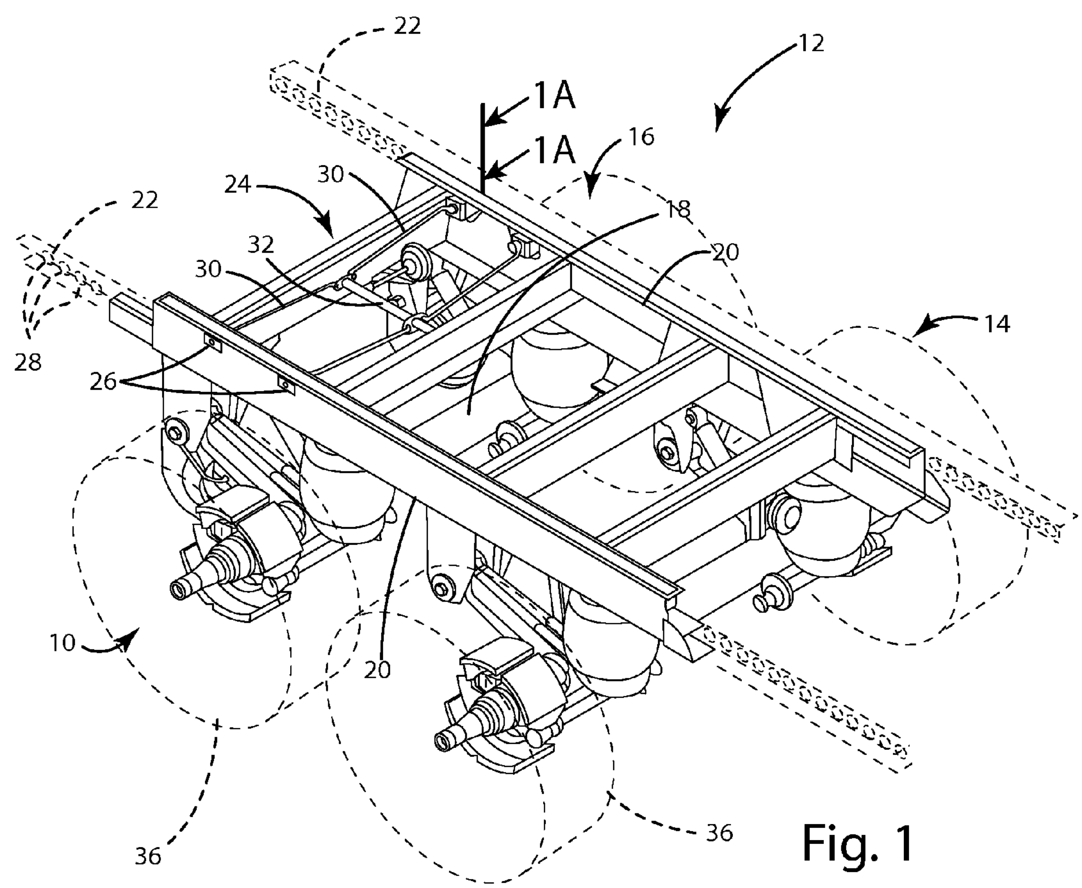
FIG. 1 is a top perspective view of a tandem axle assembly with air suspension and having an axle lift assembly, according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, the reference number 10 generally designates an axle lift assembly of the present invention. In the illustrated embodiment, the axle lift assembly 10 is shown on a tandem axle assembly 12 that is adapted for use on a vehicle, specifically a rear portion of a semi-trailer. However, it is contemplated that the tandem axle assembly 12 may be used on other vehicles, such as trucks and trailers with various axle arrangements, including semi-trucks, tractors, enclosed trailers, flat bed trailers, trailers with steerable axles, and other wheeled vehicles with more than two axles as generally understood by one having ordinary skill in the art.

The illustrated tandem axle assembly 12, as shown in FIG. 1, includes a rear axle assembly 14 and a front axle assembly 16, which may conceivably be reversed in other embodiments. The front and rear axle assemblies 16, 14 each include a non-steerable axle 18 laterally extending between a pair of trailing-arm air suspension systems. Conceivably, the rear axle assembly 14 may employ an alternative suspension system. As illustrated, the front and rear axle assemblies 16, 14 are extending between a pair of longitudinal beams 20 that extend along a longitudinal extent of the trailer. The longitudinal beams 20 are each slidably coupled with a corresponding frame member 22 that similarly extends along the longitudinal extent of a lower portion of a chassis of the trailer. The longitudinal beams 20 include a locking assembly 24 to prevent sliding movement of the tandem axle assembly 12 relative to the chassis of the trailer. The locking assembly 24 includes a pair of retractable lugs 26 that extend outward from the longitudinal beams 20 to selectively engage a pair of a plurality of apertures 28 that are spaced along a length of the frame member 22. Engagement of the lugs 26 of the locking assembly with the plurality of apertures 28 restricts sliding movement of the beam 20 relative to the frame member 22. It is conceivable that in alternative embodiments the lugs and apertures may be reversed or other means to restrict the longitudinal movement of the tandem axle assembly 12 may be employed.

Figure 1A:
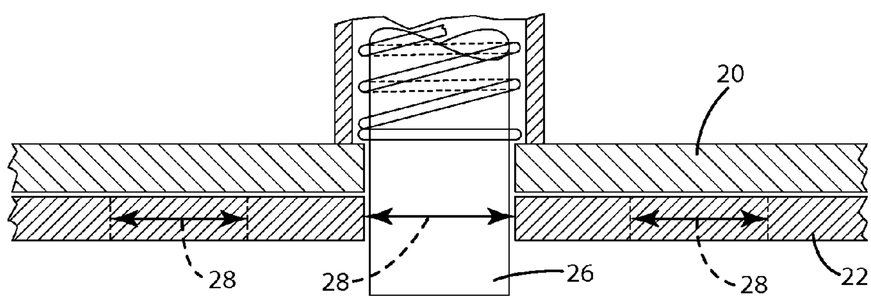
FIG. 1A is a cross section view of a lug extending from a longitudinal beam of the tandem axle assembly to engage an aperture on a vehicle frame member, taken at line IA-IA of FIG. 1.

As further illustrated in FIG. 1A, a retractable lug 26 is shown extending laterally from the beam 20 to extend through an aperture 28 of the plurality of apertures on the frame member 22. An inboard portion of the retractable lug 26 is partially contained in a housing that holds a spring that biases the lug 26 laterally outward. The lugs 26 each include a tension rod 30 (FIG. 1) that extends from the inboard portion the lugs 26 to a central bar 32 that is longitudinally disposed between the longitudinal beams 20. The central bar 32 is rotatably configured with cams that engage the tension rods 30, such that rotation of the central bar 32 moves the cams to draw the tension rods 30 inward and thereby pull the retractable lugs 26 inward to allow slidable movement of the tandem axle assembly 12 longitudinally relative to the chassis of the vehicle.

Figure 2:
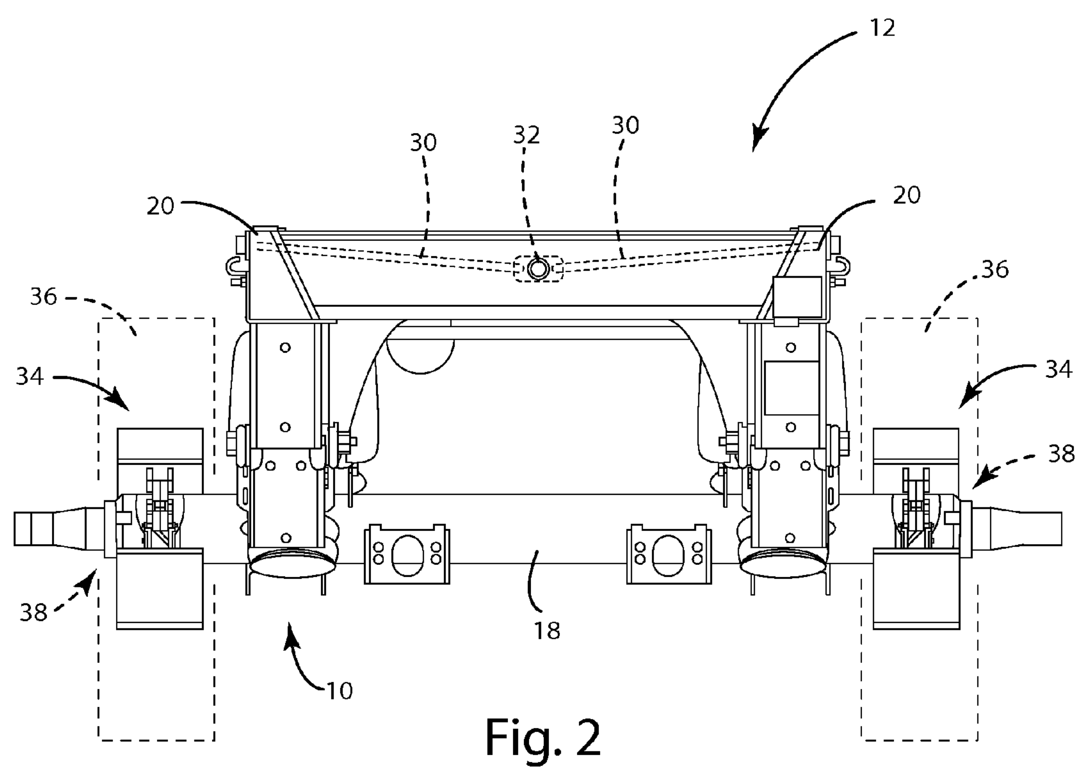
FIG. 2 is a front elevational view of the tandem axle assembly.

As shown in FIG. 2, the front axle assembly 16 includes a brake assembly 34 coupled with the distal ends of the front axle 18. Accordingly, the distal ends of the front axle 18 also include wheel assemblies 36 that are configured to be releasably engaged by the brake assemblies 34 to reduce and cease rotation of the wheel assemblies 36. The wheel assemblies 36 include a tire for contacting a road or ground surface and, in one embodiment, a tire pressure sensor 38 for monitoring the air pressure of the tire. It is contemplated that the tires may include dual tires for increasing tire surface contact with the road surface. It is also understood that the rear axle assembly 14 (FIG. 1) includes a corresponding wheel assembly 36 on the opposing side of the axle 18 that may also similarly include tire pressure sensors 38 and other related components.

Figure 3:
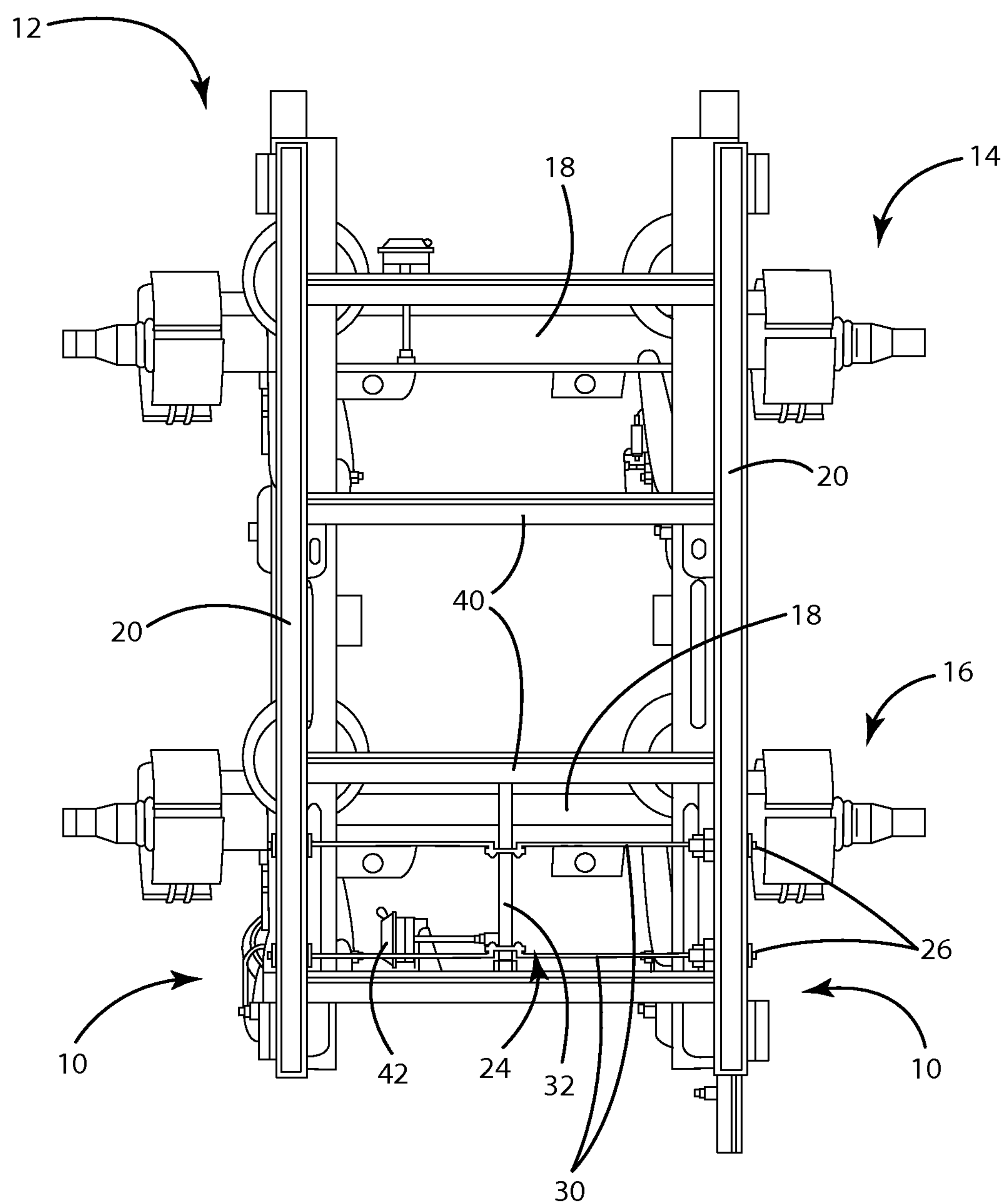
FIG. 3 is a top plan view of the tandem axle assembly.
Figure 4:
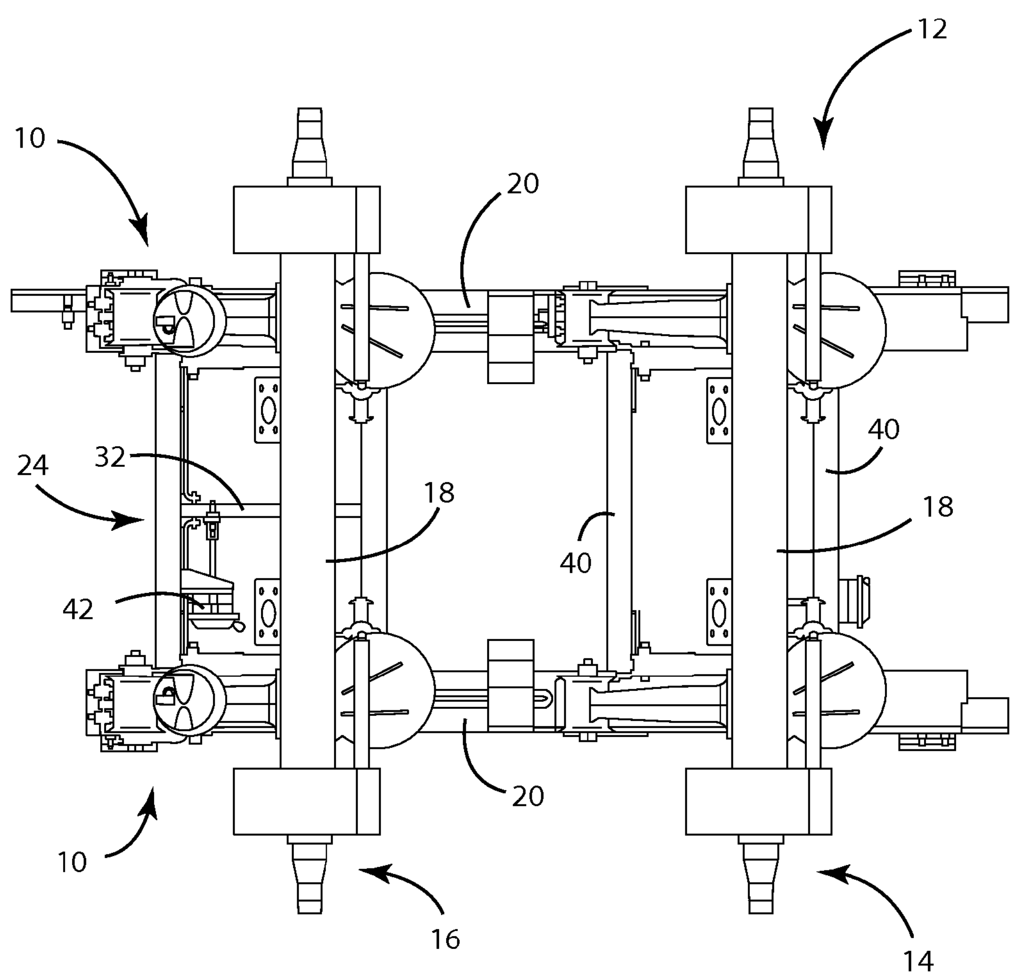
FIG. 4 is a bottom plan view of the tandem axle assembly.

Referring now to FIGS. 3 and 4, the tandem axle assembly 12 includes a number of cross members 40 that extend substantially orthogonally between the longitudinal beams 20. The central bar 32 that operates to retract the retractable lugs 26 from engagement with the frame member 22 (FIG. 1A) is rotatably coupled between the cross members 40 proximate the front axle assembly 16. An auxiliary pneumatic cylinder 42 includes an actuation shaft that is coupled to the central bar 32 with a rotational coupling that surrounds a portion of the central bar 32 for rotating the central bar 32 upon actuation of the auxiliary pneumatic cylinder 42. It is contemplated that alternative actuation mechanisms, such as solenoids or electric motors, may be employed to engage and disengage the plurality of lugs 26 with the apertures 28 in the frame member 22 (FIG. 1A).

Figure 5:
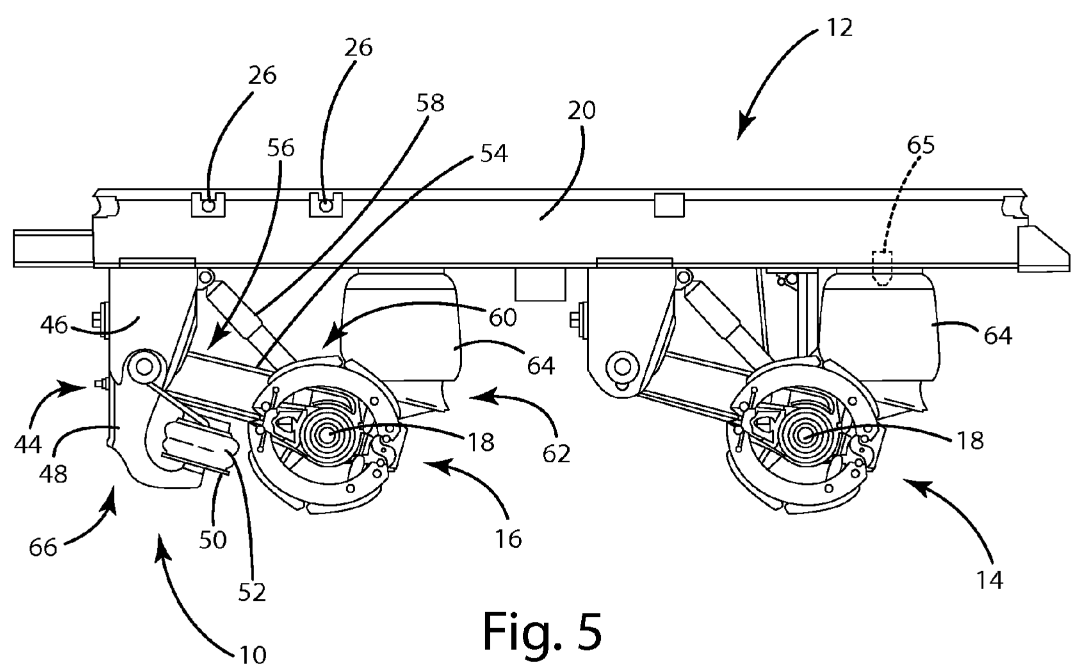
FIG. 5 is a side elevational view of the tandem axle assembly.

As illustrated in FIG. 5, a single side of the tandem axle assembly 12 is shown, although it is understood in the foregoing description that the opposing side of the tandem axle assembly 12 includes like parts, unless specified to the contrary. As shown in the illustrated embodiment, a support bracket 44 extends down from the beam 20 proximate the front axle assembly 16. The support bracket 44 has an upper portion 46 coupled with the beam 20 and a lower portion 48 pivotally coupled with the upper portion 46. The lower portion 48 includes a platform 50 longitudinally protruding toward the axle 18 for supporting a pneumatic actuator 52. More specifically, the platform 50 is defined on a rearward end of the generally L-shaped lower portion 48 of the support bracket 44. A trailing arm 54 of the front axle assembly 16 includes a first end 56 pivotably coupled with the upper portion 46 of the support bracket 44, above the pivotal connection between the upper and lower portions 46, 48 of the support bracket 44. A cylindrical shock 58 is pivotably coupled with and extends down from the longitudinal beam 20 proximate the connection with the support bracket 44 to engage the axle 18 proximate the trailing arm 54. It is contemplated that the support bracket 44 may be a unitary bracket, an integral piece of the longitudinal beam 20, or other conceivable geometric configurations that incorporates a lift assembly 66.

Figure 6:
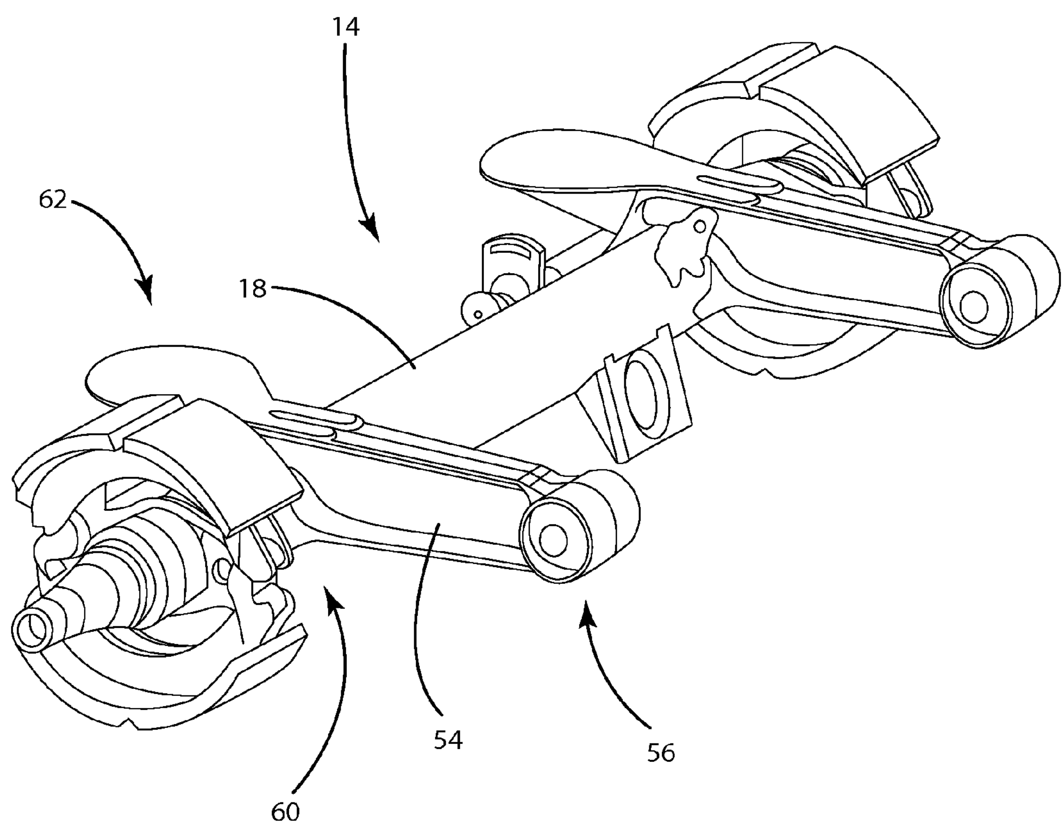
FIG. 6 is a top perspective view of an axle, the associated trailing arms, and the brake assemblies of the axle lift assembly.

The axle 18 on the rear axle assembly 14, as shown in FIGS. 5 and 6, is rotatably coupled with an intermediate portion 60 of the trailing arm 54, between the first end 56 and a second end 62 of the trailing arm 54, in a substantially similar manner as the front axle assembly 16. In further similarity to the front axle assembly 16, the axle 18 of the rear axle assembly 14 includes a sleeve for an axle shaft to rotate within, such that the intermediate portion of the trailing arm

54 couples with the sleeve of the axle 18 to permit rotation of the axle shaft at the distal ends for corresponding rotation of the wheel assemblies 36. An air spring 64, or ride bag, is disposed between the second end 62 of the trailing arm 54 and the longitudinal beam 20 for receiving the downward load from the tire riding on a road or ground surface and for receiving, and in some instances absorbing, an upward force on the axle 18, such as impact forces from the tire hitting bumps on the road surface. The air springs 64 on both the front and rear axle assemblies 16, 14 are coupled with a substantially planar and circular surface on the second end 62 of the trailing arm 54. The substantially planar surface on the second end 62 of the trailing arm 54 is defined by a tear-shaped plate coupled with an upper surface of the trailing arm 54 proximate the second end 62. It is conceivable that in additional embodiments that the axle 18 and the air springs 64 may be alternatively coupled with trailing arm 54 closer to the second end 62 or the first end 56 of the trailing arm 54.

As shown in FIG. 5, the air spring 64 on the rear axle assembly 14, and conceivably also on the front axle assembly 16, includes an air pressure sensor 65 that monitors the air pressure of the corresponding air spring 64. The air pressure sensor 65 may be used to monitor the weight of the load proximate the associated axle assembly by taking into consideration the difference in air pressure of the air spring 64 between an unloaded state and a loaded state. In addition, it is contemplated that the air springs 64 on the front and rear axle assemblies 16, 14 (FIG. 5) may jointly include an air pressure sensor that monitors the air springs 64 of both axle assemblies.

Figure 7:
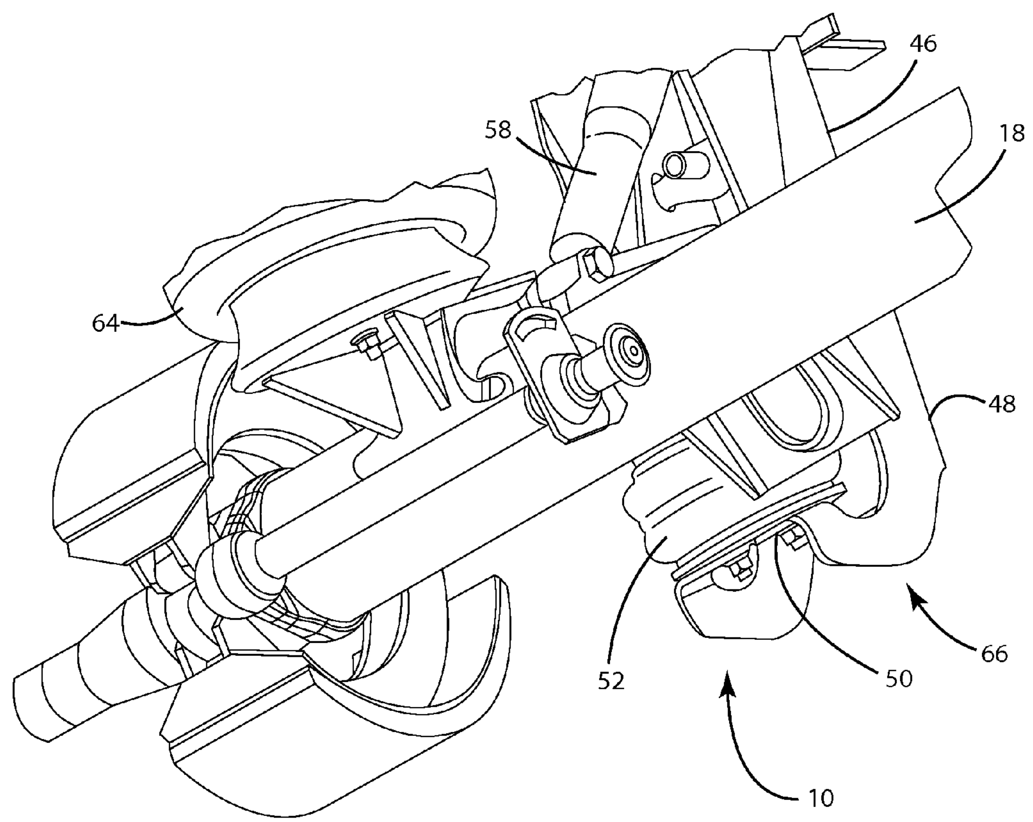
FIG. 7 is a fragmentary bottom perspective view of the axle lift assembly, showing a trailing arm, an air spring, and a pneumatic actuator of the axle lift assembly.
Figure 8:
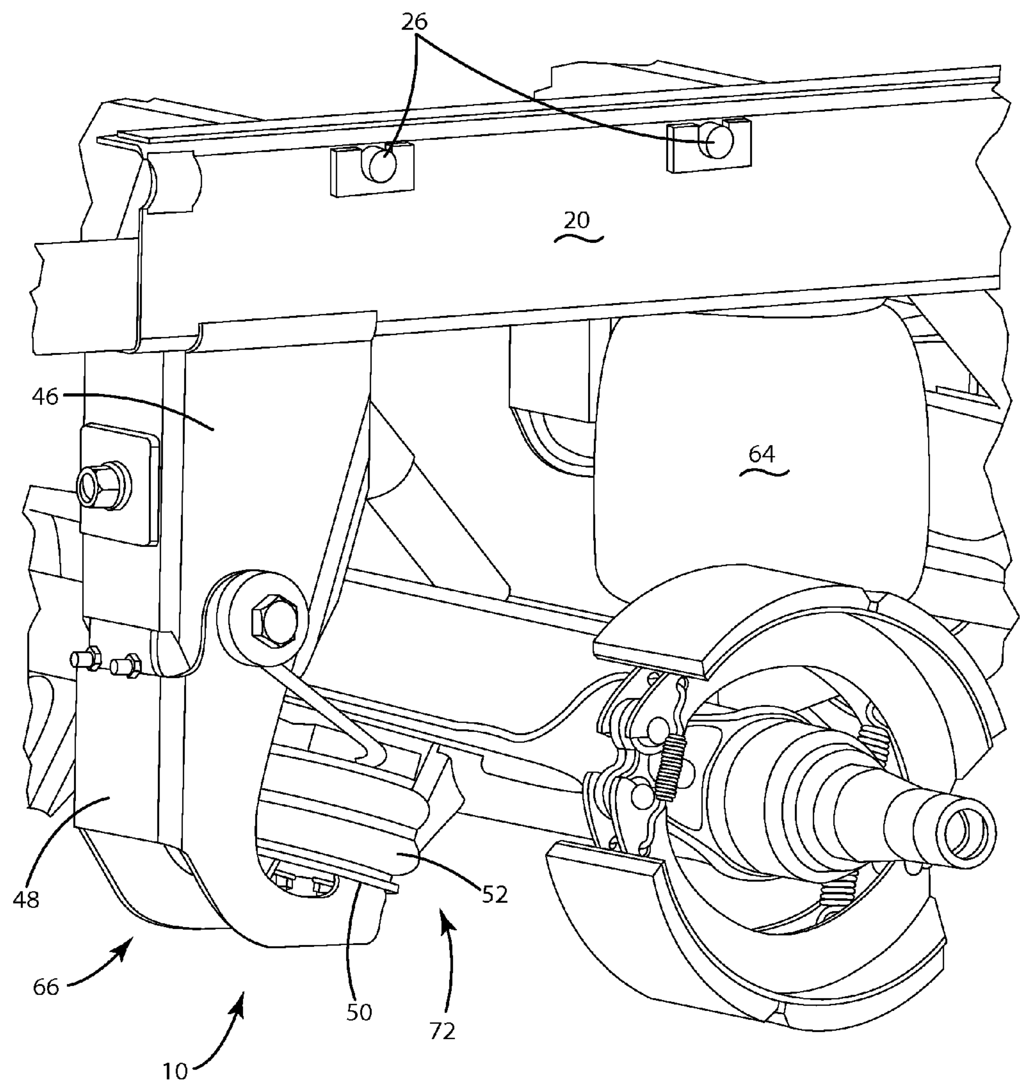
FIG. 8 is a fragmentary top perspective view of the axle lift assembly, showing a support bracket of the axle lift assembly.
Figure 9:
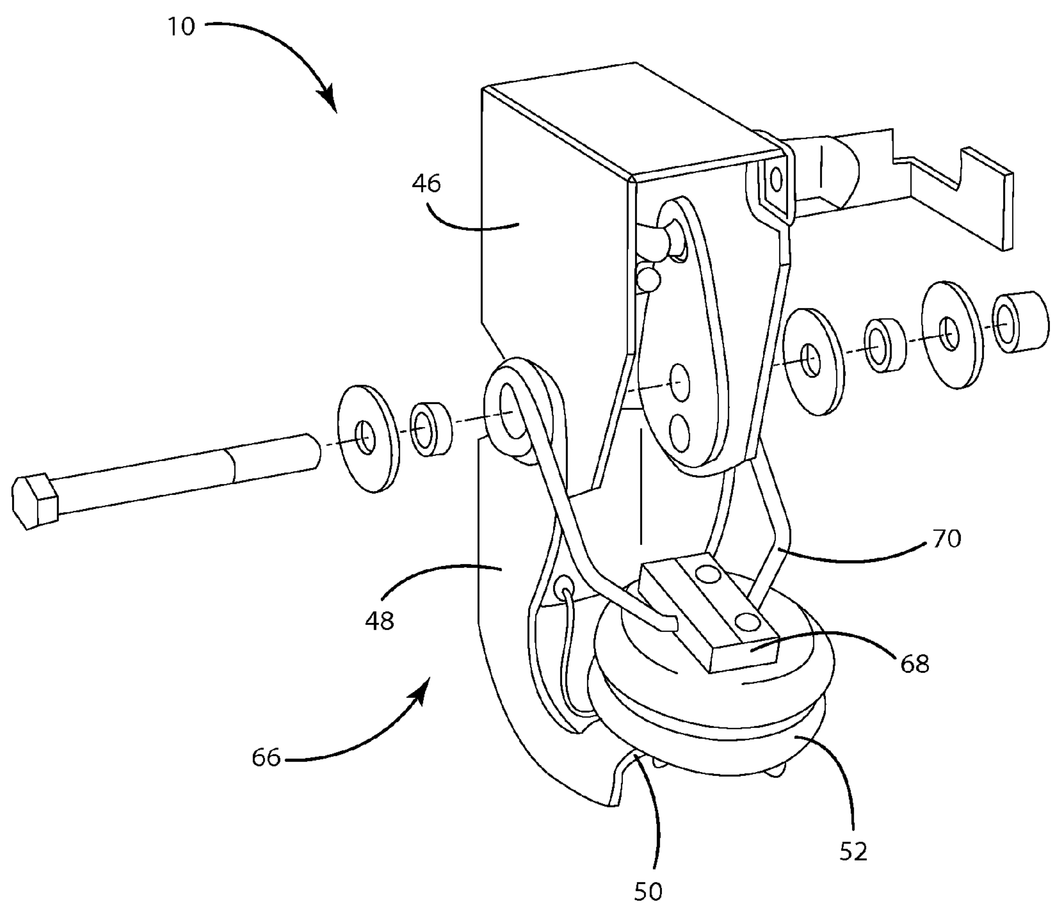
FIG. 9 is an exploded top perspective view of the support bracket and a pneumatic actuator of the of the axle lift assembly.

Referring now to FIGS. 7-9, a lift assembly 66 is generally coupled between the trailing arm 54 (FIG. 6) and the longitudinal beam 20. The lift assembly 66, according to one embodiment, includes a pneumatic actuator 52 that is disposed between the platform 50 longitudinally protruding from the lower portion 48 of the support bracket 44 (FIG. 5) and the trailing arm 54. More specifically, the pneumatic actuator 52 includes a bearing block 68 on an upper surface of the pneumatic actuator 52. The bearing block 68 is configured to abut a bottom surface of the trailing arm 54 between the first end 56 (FIG. 6) of the trailing arm 54 and the axle 18. A guide arm 70 is coupled with the bearing block 68 and extends to couple with the support bracket 44 at the pivotal connection between the upper and lower portions 46, 48 of the support bracket 44. The pneumatic actuator 52 is adjustable with compressed air between a deflated position 72 (FIG. 10) and an inflated position 74 (FIG. 11). In the deflated position 72, as also shown in FIG. 8, the bearing block 68 may be out of contact with the trailing arm 54 and the tire on the associated axle 18 is in load bearing contact with the road surface, defining the ground engagement position 76 (FIG. 10), of the axle 18, as further described below. In the inflated position 74, the pneumatic actuator 52 is inflated to raise upward from the platform 50 on the support bracket 44 and put the bearing block 68 into contact with the trailing arm 54, ultimately raising the axle 18 to a lifted position 78 (FIG. 11) to elevate the tire from the road surface. When the pneumatic actuator 52 moves to the inflated position 74, the guide arm rotates about the pivotal connection between the upper and lower portions of the support bracket 44.

Figure 10:
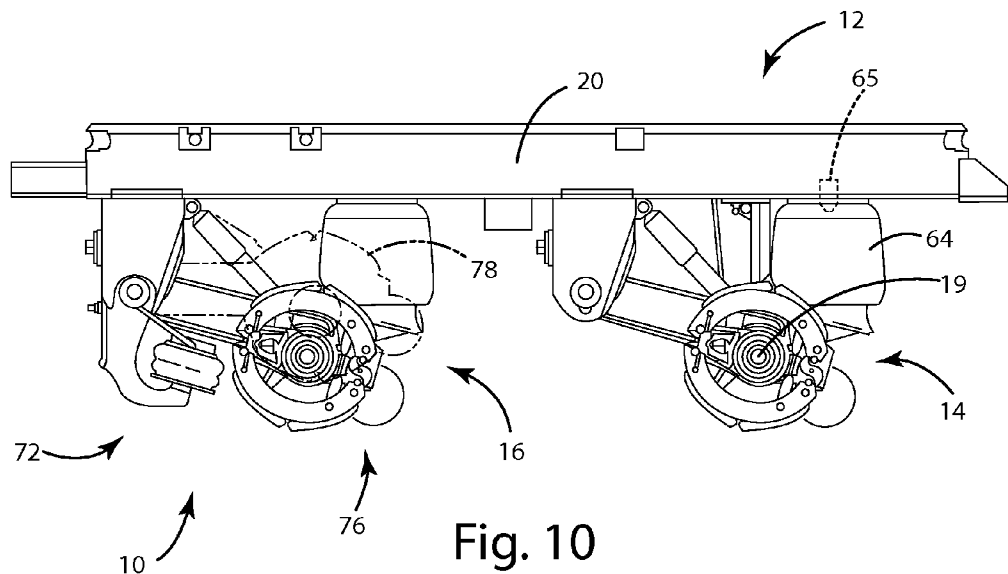
FIG. 10 is a side elevational view of the tandem axle assembly, showing the axle of the axle lift assembly in a ground engagement according to one embodiment.
Figure 11:
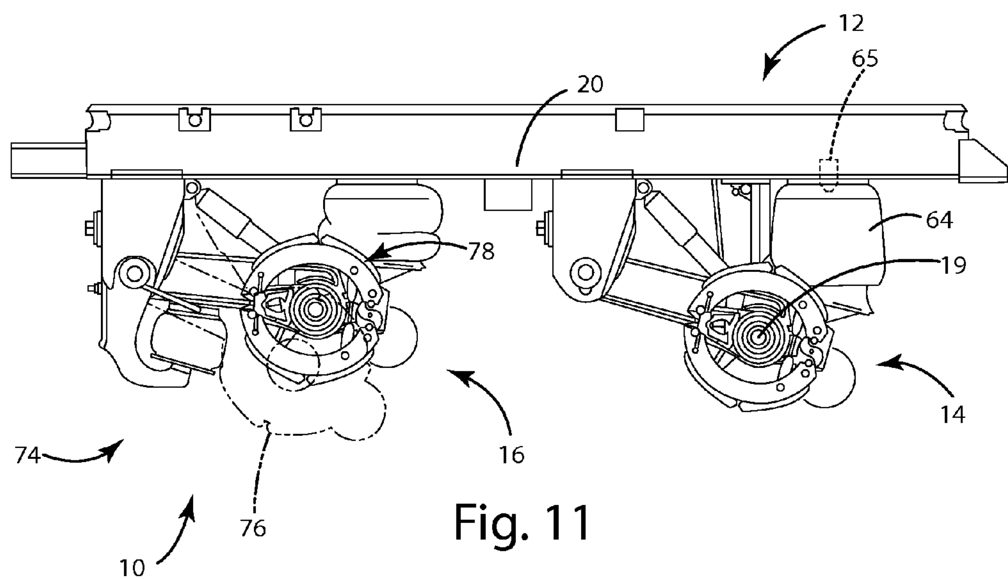
FIG. 11 is a side elevational view of the tandem axle assembly, showing the axle of the axle lift assembly in a lifted position.

As further illustrated in FIG. 10, one embodiment of the lift assembly 66 has the front axle assembly 16 in the ground engagement position 76 and shows the lifted position 78 in fragmented lines. In the ground engagement position 76, the air spring 64 of the front axle assembly 16 is pressurized to receive and absorb upward forces from the front axle 18 (FIG. 7). As illustrated in FIG. 11, the lift assembly 66 is activated to place the front axle 18 in the lifted position 78, also showing the ground engagement position 76 in fragmented lines. In the lifted position 78, the air spring 64 of the front axle assembly 16 has air released to depressurize and to allow the axle 18 to be moved toward the longitudinal beam 20 a distance adapted to raise the associated tire on the front axle 18 away from the road or ground surface. The lift assembly 66 may be actuated between the ground engagement position 76 and the lifted position 78, adjusting the pneumatic actuator 52 (FIG. 9) between the deflated and inflated positions 72, 74, respectively, by operating the air system of the vehicle manually or automatically. Automatic actuation of the lift assembly 66 may be selected by a user, whereby a controller on the vehicle operates the lift assembly 66 using a first automatic system, a second automatic system, or other conceivable automatic actuation systems.

Figure 12:
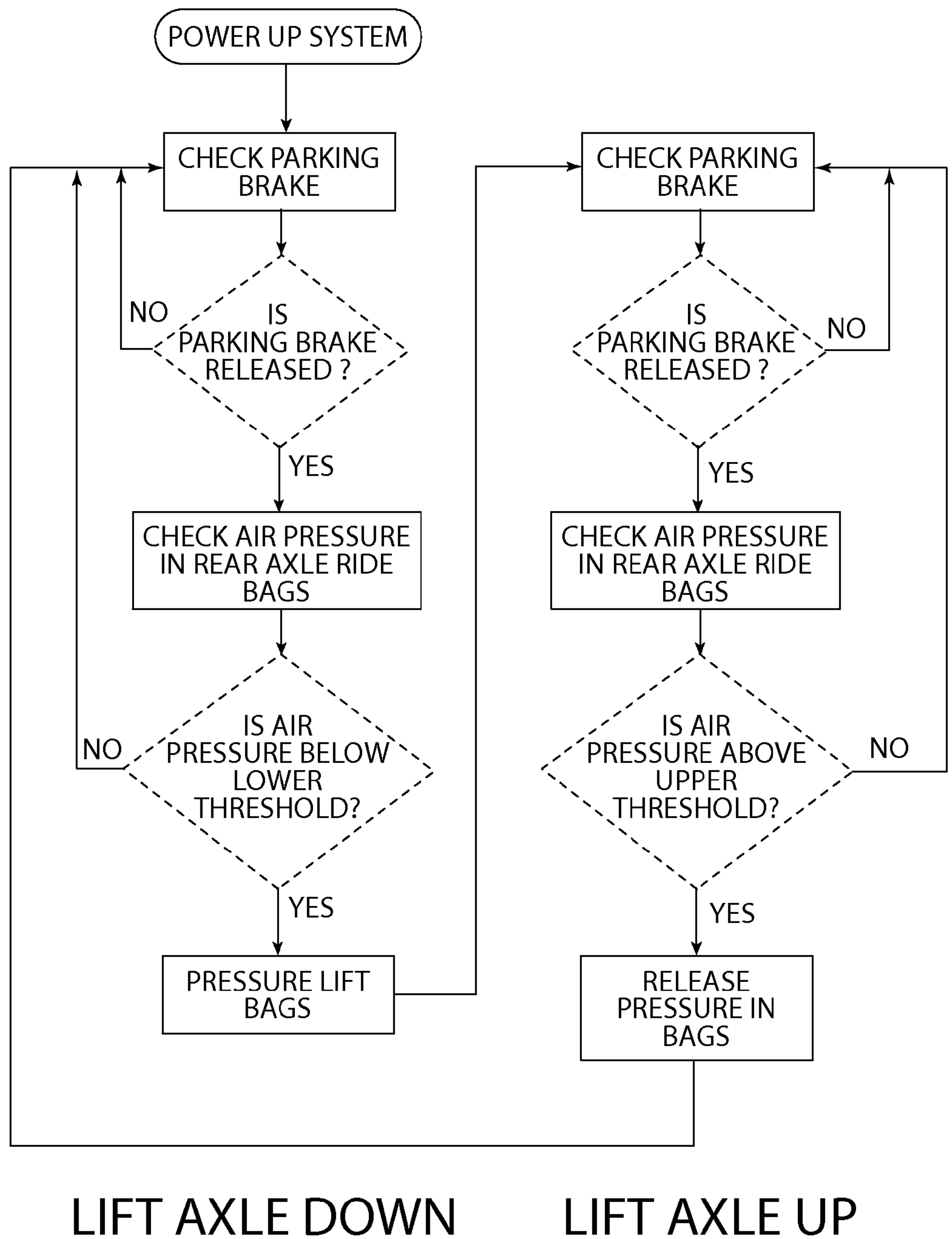
FIG. 12 is a flow chart of one embodiment of a system for controlling the axle lift assembly.

The first automatic actuation system, as illustrated in FIG. 12, is operated by receiving input from the air pressure sensor 65 on the air springs 64 of the rear axle assembly 14. Specifically, after the system is powered up and pressurized air is available to operate the lift assembly 66, the system first checks to see if the parking brake of the vehicle is released. If the parking brake is released, then the system determines that the vehicle is being operated. It is contemplated that other indicators may be used to determine if the vehicle is being operated, such as a speed sensor, an ignition sensor, a GPS device, or other conceivable sensors or indications. Upon determination that the vehicle is being operated, namely the parking brake is released, the air pressure is monitored in at least one of the air spring 64 of the rear axle assembly 14 by the air pressure sensors 65. It would also be possible to alternatively or additionally monitor air springs 64 on the front axle assembly 16.

As further shown in FIG. 12, when the lift assembly 66 is in the deflated position 72, and the front axle 18 is in the ground engagement position, such that the air spring 64 of the front axle assembly 16 is receiving upward forces from the axle 18, the lift assembly 66 will automatically move the front axle 18 to the retracted position by inflating the pneumatic actuator 52 to the inflated position 74 when the air pressure sensed by the pressure sensor 65 on the air spring 64 of the rear axle assembly 14 is below a lower threshold level. The lower threshold level is configured to be a pressure level that would indicate the smallest payload weight that is best suited to be carried with both the front and rear axles 18 supported on the ground. In other words, having an air pressure below the lower threshold level is indicative of a payload weight acceptable for the rear axle to support without the need to disperse the weight between the front and rear axles. Similarly, when lift assembly 66 is in the inflated position 74, or otherwise deployed, and the front axle is in the lifted position, such that the air spring 64 on the front axle assembly 16 is not receiving upward forces from the axle 18, the lift assembly 66 will automatically move the front axle 18 to the ground engagement position 76 by releasing air in the pneumatic actuator 52 when the air pressure on the air spring 64 of the rear axle assembly 14 is above an upper threshold level. Having an air pressure above the upper threshold level is indicative of a payload weight large enough to exceed the suggested carrying capacity of the rear axle alone, and thereby require both the front and rear axles to disperse the weight. The difference between the upper and lower threshold levels may be negligible, such that they can be referred to generally as a threshold level; however the purpose of the difference is to prevent actuation of axle lift assembly due to minor variations in load weight that may be due to errors in the sensor 65 measurements, shifts in the load, bumps on the road, or other conditions that would cause minor variations in the sensor measurements, as generally understood by one having ordinary skill in the art. The first actuation system also continues to monitor the parking brake to power down the automatic actuation system when the parking brake is engaged. It is conceivable that the actuation system may be disabled manually by an operator.

Figure 13:
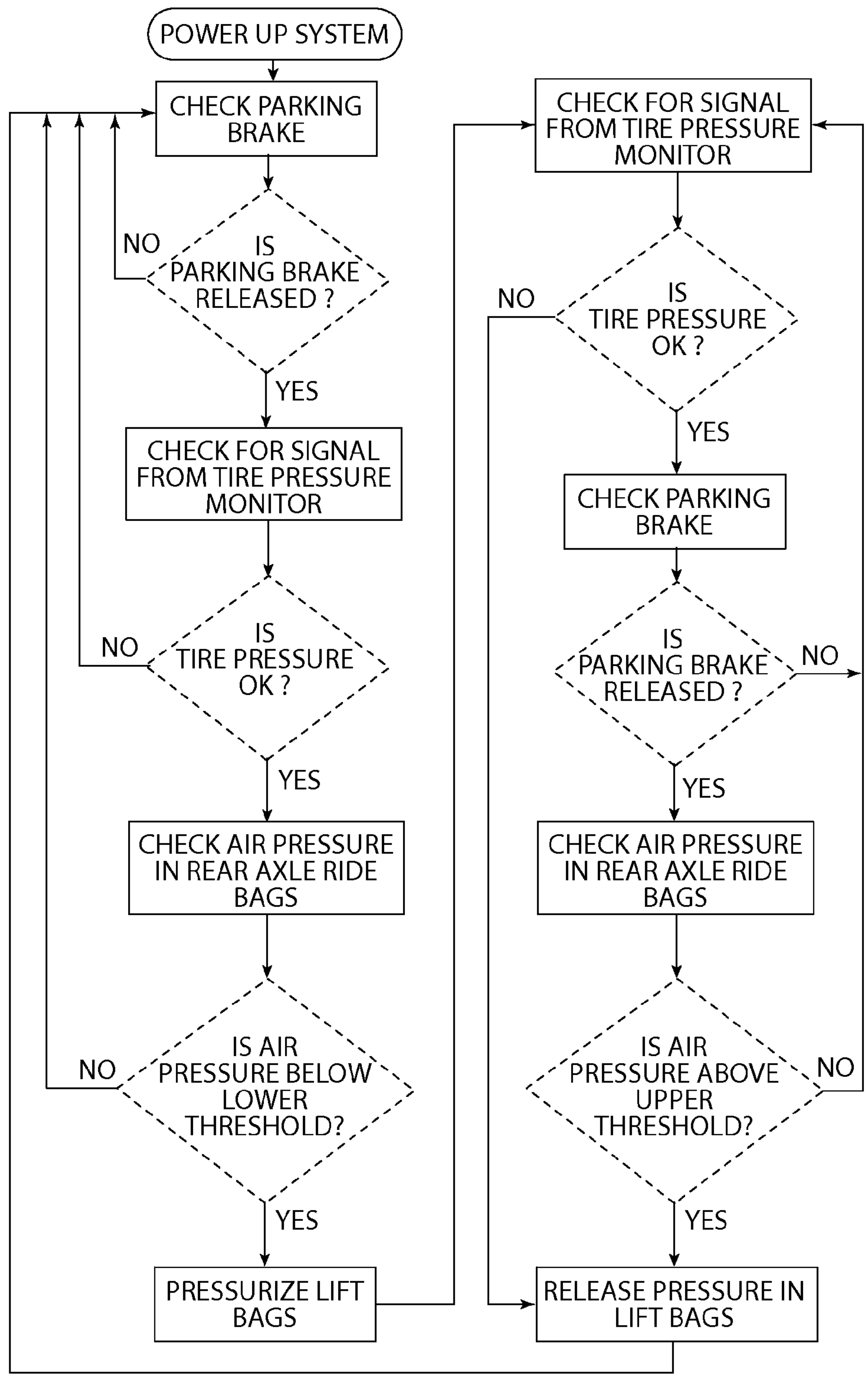
FIG. 13 is a flow chart of an additional embodiment of a system for controlling the axle lift assembly with a step of monitoring a tire pressure.

As shown in FIG. 13, the second automatic actuation system is alternatively operated with additional input from the tire pressure sensors 38. Again, the second actuation system first checks to see if the parking brake is released to determine whether the vehicle is being operated. When the parking brake is released, the tire pressure on the rear axle assembly 14 is monitored with the tire pressure sensors 38. If the tire pressure is outside an acceptable tire pressure range, as generally understood in the art as a range that causes damage to the tires or presents a risk of tire failure, the system does not allow the lift assembly 66 to automatically move the front axle 18 to the lifted position 78. Similarly, if the front axle 18 is already in the lifted position 78 and the tire pressure sensors 38 sense the tire pressure on the rear axle assembly 14 to be outside the acceptable tire pressure range, the front axle 18 is move to the ground engagement position 76 by releasing air from the pneumatic actuator 52. Therefore, if the vehicle 12 is operating solely on the rear axle 18 with low tire pressure, the front axle 18 will lower to the ground engagement position 76 to provide additional support to the vehicle 12 and disable automatic actuation of the lift assembly 66 until the tire pressure returns within the acceptable tire pressure range. Otherwise, if the tire pressure is acceptable, the system monitors the air pressure of the air springs 64 with the air pressure sensors 65, similar to the first automatic actuation system, to determine, in view of the threshold level, whether the lift assembly 66 should move the front axle 18 between the ground engagement position and the lifted position. It is also contemplated that the tire pressure sensors 38 may be alternatively monitored in a similar manner to the air pressure sensors 65 to determine the payload weight for actuating the lift assembly 66 between the deflated and inflated positions.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An axle lift assembly, comprising:

a vehicle frame;

a beam slidably coupled with a longitudinal extent of the vehicle frame, an arm having a first end pivotably coupled proximate the beam, a second end, and an intermediate portion there between;

an axle rotatably coupled with the intermediate portion of the arm;

an air spring disposed between the second end of the arm and the beam for receiving an upward force from a wheel on the axle contacting a ground surface;

a support bracket extending down from the beam proximate the first end of the arm;

a pneumatic actuator disposed between the support bracket and the arm for raising the axle from a ground engagement position to a lifted position that substantially eliminates the upward force on the air spring; and a component for monitoring a condition indicative of a weight of a load carried by the vehicle frame, wherein the pneumatic actuator raises the axle to the lifted position when the component is indicative of the weight being less than a threshold weight.

2. The axle lift assembly of claim 1, further comprising:

a locking assembly coupled with the beam for releasably engaging the vehicle frame to prevent the beam from sliding relative to the vehicle frame.

3. The axle lift assembly of claim 2, wherein the vehicle frame has a frame member longitudinally extending on the longitudinal extent of the vehicle frame and having a plurality of apertures spaced along the frame member, and wherein the locking assembly includes a retractable lug that selectively engages one of the plurality of apertures.

4. The axle lift assembly of claim 1, wherein the first end of the arm pivotably couples with an upper portion of the support bracket.

5. The axle lift assembly of claim 4, wherein the support bracket includes a lower portion having a platform longitudinally protruding toward the axle for supporting the pneumatic actuator.

6. The axle lift assembly of claim 1, wherein the component includes an air pressure sensor for monitoring an air pressure of a second air spring of a second axle.

7. The axle lift assembly of claim 1, wherein the component includes a tire pressure sensor for monitoring an air pressure of a second wheel on a second axle.

8. An axle lift assembly comprising:

a vehicle frame;

a beam slidably coupled with a longitudinal extent of the vehicle frame, an arm having a first end pivotably coupled proximate the beam, a second end, and an intermediate portion there between;

an axle rotatably coupled with the intermediate portion of the arm;

an air spring disposed between the second end of the arm and the beam for receiving an upward force from a wheel on the axle contacting a ground surface;

a support bracket extending down from the beam proximate the first end of the arm;

a pneumatic actuator disposed between the support bracket and the arm for raising the axle from a ground engagement position to a lifted position that substantially eliminates the upward force on the air spring;

a second axle coupled with the beam forward or rearward from the axle; and a second air spring disposed between the second axle and the beam, wherein the second air spring has a sensor for monitoring an air pressure of the second air spring, and wherein the pneumatic actuator raises the axle to the lifted position when the sensor senses the air pressure of the second air spring below a threshold level.

9. An axle lift assembly for a trailer, comprising:

a longitudinal beam adapted for slidably coupling with a frame member of the trailer;

a trailing arm having a first end pivotably coupled with the longitudinal beam, a second end, and an intermediate portion there between;

an axle rotatably coupled with the intermediate portion of the trailing arm;

an air spring disposed between the second end of the trailing arm and the longitudinal beam for receiving an upward force on the axle;

a support bracket extending down from the longitudinal beam proximate the first end of the trailing arm; and a pneumatic actuator disposed between the support bracket and the trailing arm and adjustable from a deflated position to an inflated position that raises the axle toward the longitudinal beam a distance adapted to raise an associated tire on the axle away from a ground surface, wherein the support bracket includes an upper portion that pivotably couples with the first, end of the trailing arm, and wherein the support bracket includes a lower portion having a platform longitudinally protruding toward the axle for supporting the pneumatic actuator.

10. The axle lift assembly of claim 9, further comprising:

a locking assembly having a retractable lug coupled with the longitudinal beam for selectively engaging an aperture on the frame member to prevent the longitudinal beam from sliding relative to the frame member.

11. An axle lift assembly for a trailer, comprising:

a longitudinal beam adapted for slidably coupling with a frame member of the trailer;

a trailing arm having a first end pivotably coupled with the longitudinal beam, a second end, and an intermediate portion there between;

an axle rotatably coupled with the intermediate portion of the trailing arm;

an air spring disposed between the second end of the trailing arm and the longitudinal beam for receiving, an upward force on the axle;

a support bracket extending, down from the longitudinal beam proximate the first end of the trailing arm;

a pneumatic actuator disposed between the support bracket and the trailing arm and adjustable from a deflated position to an inflated position that raises the axle toward the longitudinal beam a distance adapted to raise an associated tire on the axle away from a ground surface;

a second axle rotatably coupled with the longitudinal beam and positioned parallel with and forward or rearward from the axle; and a second air spring disposed between the second axle and the longitudinal beam and having a sensor for monitoring an air pressure of the second air spring, wherein the pneumatic actuator adjusts to the inflated position when the sensor senses the air pressure is below a threshold level.

12. The axle lift assembly of claim 11, further comprising:

a second tire coupled with the second axle;

a tire pressure sensor that monitors an air pressure of the second tire, wherein the pneumatic actuator adjusts to the deflated position when the air pressure of the second tire is outside an acceptable tire pressure range.

13. A vehicle, comprising:

a frame member;

a slide assembly coupled with the frame member;

a first axle assembly coupled with the slide assembly and including:

a trailing arm having a first end pivotably coupled with the slide assembly;

a first air spring coupled between the first end and a second end of the trailing arm;

a first axle rotatably coupled with the trailing arm;

a first wheel coupled with a distal end of the first axle and having a first tire for contacting a ground surface; and a lift assembly coupled between the trailing arm and the slide assembly, wherein the lift assembly is actuatable between a ground engagement position allowing the first tire to contact the ground surface and a lifted position elevating the first tire away from the ground surface;

a second axle assembly including:

a second axle parallel with the first axle;

a second air spring coupled between the second axle and the frame member; and a sensor for monitoring an air pressure of the second air spring, wherein the lift assembly moves between the ground engagement and lifted positions based on the air pressure of the second air spring, and wherein the slide assembly slidably adjusts the longitudinal position of at least the first axle assembly relative to the frame member.

14. The vehicle of claim 13, wherein the lift assembly moves to the lifted position when the air pressure of the second air spring is less than a threshold level.

15. The vehicle of claim 13, wherein the second axle assembly is longitudinally spaced on the frame member from the first axle assembly for supporting the frame member, and wherein the first axle assembly is forward the second axle assembly.

16. The vehicle of claim 13, wherein the second axle assembly includes a tire pressure sensor for monitoring an air pressure of a second tire coupled with the second axle, and wherein the lift assembly moves to the ground engagement position when the air pressure of the second tire is above a threshold level.

17. The vehicle of claim 13, wherein the lift assembly includes:

a support bracket extending down from the frame member proximate the first end of the trailing arm; and a pneumatic actuator disposed between the support bracket and the trailing arm and inflatable to move the lift assembly from the ground engagement position to the lifted position.

18. The vehicle of claim 17, further comprising:

a locking assembly having a retractable lug coupled with the slide assembly for selectively engaging an aperture on the frame member to prevent the slide assembly from sliding relative to the frame member, wherein the slide assembly includes a beam slidably coupled with and extending on a longitudinal extent of the frame member, and wherein the first and second axle assemblies are coupled with the beam for adjusting the longitudinal position of the first and second axle assemblies relative to the frame member.

* * * * *

UNITED STATES PATENT AND TRADEMARK OFFICE

CERTIFICATE OF CORRECTION

PATENT NO. : 8,695,998 B1
APPLICATION NO. : 13/966789
DATED : April 15, 2014
INVENTOR(S) : Johnathon Karel et al.

It is certified that error appears in the above-identified patent and that said Letters Patent is hereby corrected as shown below:

In the Claims

Col. 9, claim 9, line 56;

“first, end” should be --first end--,

Col. 10, claim 11, line 7;

“receiving, an” should be --receiving an--,

Col. 10, claim 11, line 9;

“extending, down” should be --extending down--.

Signed and Sealed this
Thirtieth Day of June, 2015

Michelle K. Lee

Michelle K. Lee
*Director of the United States Patent and Trademark Office*